Figure 1:
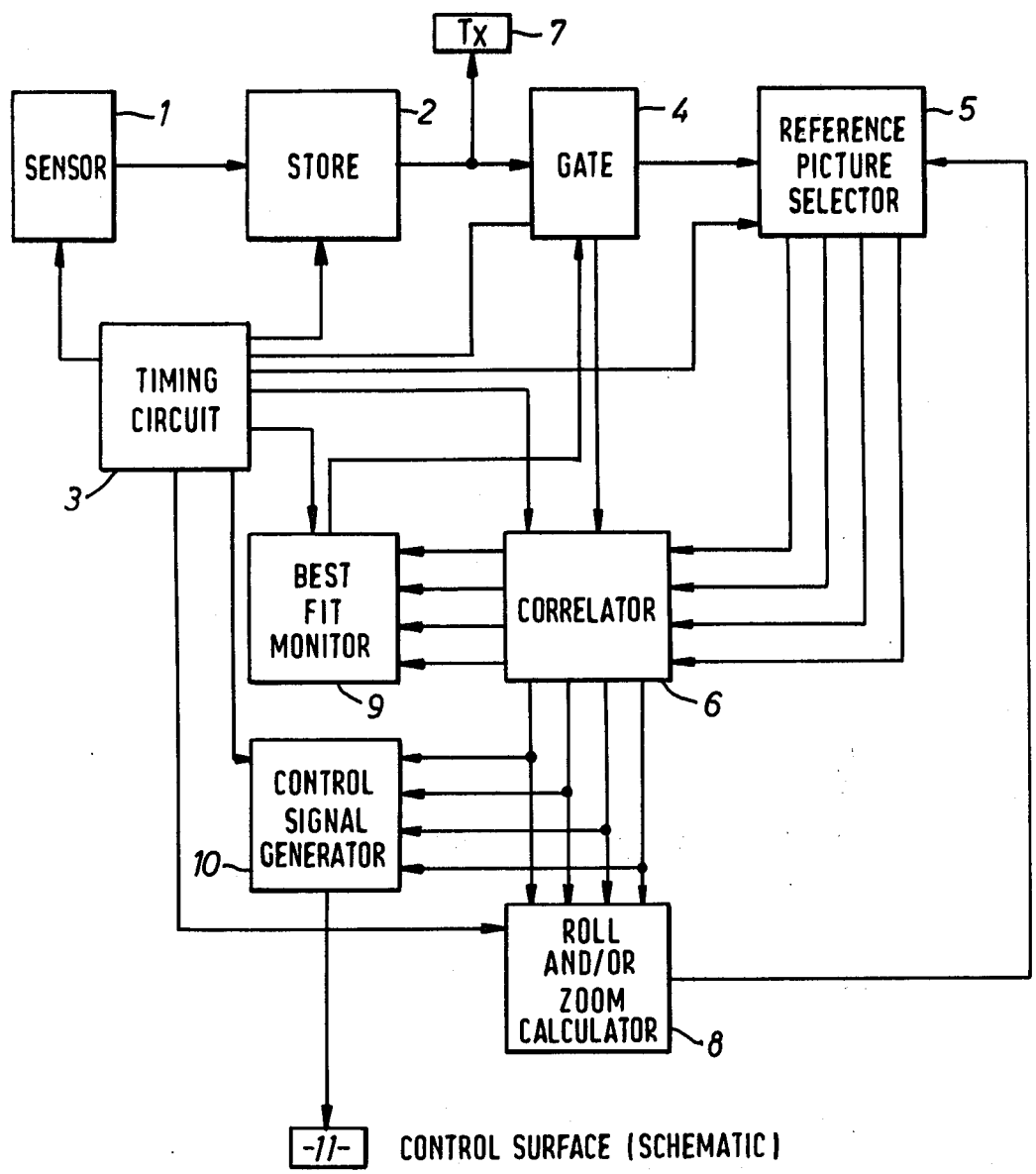

United States Patent [19]

Voles

[11] 4,162,775
[45] Jul. 31, 1979

[54] TRACKING AND/OR GUIDANCE SYSTEMS

[75] Inventor: Roger Voles, London, England

[73] Assignee: E M I Limited, Hayes, England

[21] Appl. No.: 743,343

[22] Filed: Nov. 19, 1976

[30] Foreign Application Priority Data

Nov. 21, 1975 [GB] United Kingdom .............. 48068/75

[51] Int. Cl.² ........................ F42B 15/02; F41G 9/00; F41G 7/00; F42B 15/10
[52] U.S. Cl. .................................................. 244/3.17
[58] Field of Search .............................. 244/3.17, 3.16

[56] References Cited

U.S. PATENT DOCUMENTS

| 3,712,563 | 1/1973 | Alpers | 244/3.17 |
| 3,943,277 | 3/1976 | Everly et al. | 244/3.17 |
| 3,955,046 | 5/1976 | Ingham et al. | 244/3.17 |
| 4,018,405 | 4/1977 | Baker | 244/3.17 |
| 4,103,847 | 8/1978 | Thomas et al. | 244/3.16 |

Primary Examiner—Samuel W. Engle
Assistant Examiner—Thomas H. Webb
Attorney, Agent, or Firm—Fleit & Jacobson

[57] ABSTRACT

The invention relates to a system for tracking and/or guidance of a vehicle or projectile using a correlation arrangement for comparing representations from a sensor mounted on the vehicle or projectile with a reference representation, the correlation being carried out by comparing portions of the representations and like portions of the reference representation to derive position coordinates for each of said portions and to evaluate from said position coordinates compensation signals for rotational misalignment and/or changes of scale as between the reference and subsequent representations.

3 Claims, 2 Drawing Figures

TRACKING AND/OR GUIDANCE SYSTEMS

The present invention relates to tracking and/or guidance systems and it relates especially, though not exclusively, to such systems as are known as auto-lock follow (or briefly A.L.F.) systems as are used, for instance, for guiding a projectile such as a missile towards a target.

In a known A.L.F. system, the projectile is provided with a sensor arrangement, for example a television camera, which provides, at a predetermined framing rate, representations of the region towards which the projectile is travelling. Acquisition of a target is achieved by transmitting the representations to a remotely located control point, where an image of the region is reconstructed and is viewed by an operator who locates the position of a target (if any) in the region and shifts the image so that the target is centralised with respect to a fixed graticule marking. The act of centralising the target is caused to generate a course correction signal which is sent to the projectile to cause it to alter its course in a sense tending to centralise the target in the field of view of the sensor arrangement. Once this has been achieved, the two way transmission link between the projectile and the control point is no longer required and can be disconnected if desired.

The projectile is provided with an arrangement which enables it, once a target has been centralised in the field of view of its sensor arrangement, to track and home onto the target. This is the true A.L.F. mode of operation and involves correlating a reference "picture", comprising a representation of the target and its immediate surroundings derived from the central region of a representation derived from the sensor arrangement after the aforementioned acquisition has been achieved, with each representation derived from the sensor arrangement. In each correlation process, the reference picture is compared with the relevant representation in each of a number of positions relative thereto; a "score" indicative of the degree of fit between the contents of the reference picture and of the representation being evaluated for each position and the co-ordinates, relative to those of the centre of the representation, of the centre of the reference picture in the position giving rise to the best score are evaluated and used to maintain the projectile on a course or used to steer the sensor which is mounted in a gimbal arrangement, such that the target remains in the centre of the field of view of the sensor arrangement.

Clearly, as the projectile approaches the target, the scale of the representations will change relative to the reference picture, and this will degrade the level of the correlation process. This is normally taken account of by monitoring the best score obtained for each correlation and up-dating the reference picture when the best score achieved falls below a predetermined reference level.

This up-dating, however, is operated so to speak in blind fashion, because the lack of correlation might not be due to relative changes of scale as between the representation and the reference picture, but it could for example, be due to the projectile rolling in flight, thus causing the representations to be rotationally misaligned with the reference picture. In this case, up-dating effects only a temporary and partial cure for lack of correlation, and may have to be effected frequently in order to maintain even a reasonable degree of correlation.

It is an object of this invention to provide a tracking and/or guidance system for a vehicle or projectile which takes account of both roll and relative scale changes as between the representations derived from the sensor arrangement and the reference picture.

According to the invention, there is provided a tracking and/or guidance system for a vehicle, the system comprising a sensor arrangement for providing representations of a field of view of a region towards which the vehicle is travelling, means for deriving, from a representation provided by the sensor arrangement, a plurality of reference representations of respective portions of a preselected area of the said field view, means for correlating each reference representation with a further representation, subsequently provided by the sensor arrangement, in each of a plurality of different positions relative to the further representation, means for ascertaining the respective positions, relative to a datum point in the representation from which the reference representations were derived, of best fit of the reference representations with corresponding portions of the further representation, and means for utilising the ascertained positions to rotate and/or change the scale of the reference representations to compensate for rotational misalignment and/or changes of scale between the representation from which the reference representations were derived and the further representation.

Figure 2:
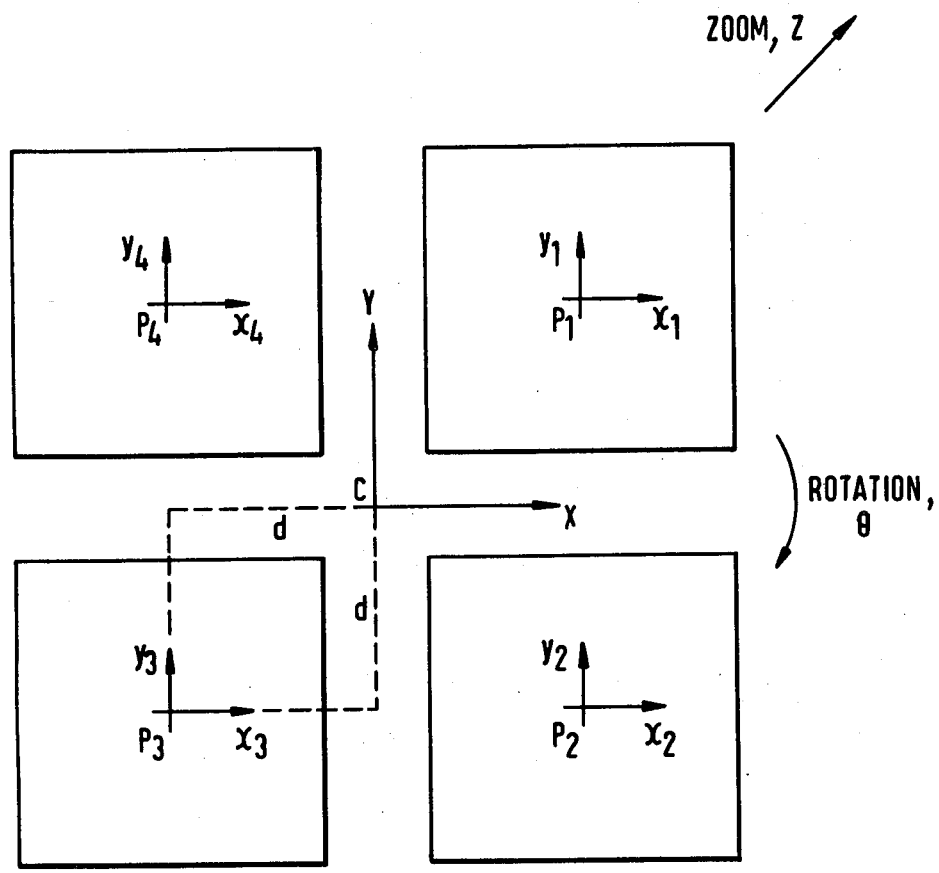

In order that the invention may be clearly understood and readily carried into effect, one embodiment thereof will now be described, by way of example only, with reference to the accompanying drawings of which:

FIG. 1 shows, in block diagrammatic form, a system in accordance with one example of the invention, and FIG. 2 illustrates schematically the derivation of signals indicative of relative rotational movement and changes of scale as between different representations of a region.

Referring now to the drawings, video signals derived from a sensor arrangement comprising a television camera and associated circuits, shown as a block 1, are digitised and applied to a suitable store 2 under the influenece of a timing circuit 3 which is also responsible for triggering the line and field deflection waveforms for the camera included in block 1. The signals stored in store 2 are applied to a gate 4 in the same order as they were received, but possibly at a different rate, and are routed either to a reference picture selector circuit 5 or to a correlator circuit 6. The following description will assume that acquisition of the target as described hereinbefore has already been achieved and that the projectile, which in this case is a missile carrying a warhead, is about to commence operating in the true A.L.F. mode. A transmitter arrangement 7 is shown by means of which the video information produced by the camera arrangement 1 can be transmitted to a control point while the missile is operating in its acquisition mode and, if desired, this transmitter arrangement can remain operational throughout the flight of the missile. It can alternatively, however, be rendered inoperative once acquisition has been achieved.

The first frame of picture information derived from store 2 after acquisition has been achieved is routed by gate 4 to the reference picture selector circuit 5, which is arranged, in known manner, to select from the information applied thereto, only that relating to a small area centrally disposed in the video picture. As the acquisition has already been achieved, this small area should include the target and thus the reference picture can be used for correlation in unit 6 with subsequently derived frames of video information.

Once the reference picture has been selected, the gate 4 is switched so as to route subsequently derived frames of video information to the correlator 6. The reference picture selector 5 is arranged to derive from the information in the reference picture representations of n portions, having substantially equal area, of the selected area. In this example, as can be seen in FIG. 2, n takes the value four, and the four portions are symmetrically disposed relative to the reference picture; the portions being disposed with their centres distant $\sqrt{2}d$ from the centre of the reference picture. As can be seen from FIG. 2, if the origin c of a cartesian co-ordinate system in X and Y is assumed to coincide with the centre of the reference picture, the centres $P_1$, $P_2$, $P_3$ and $P_4$ respectively of the four portions of the reference frame are disposed initially such that a line joining $P_1$ to $P_3$ perpendicularly bisects the line joining $P_2$ to $P_4$; the lines being concurrent at the origin c. In FIG. 2, the four portions are shown as being spaced from one another, but this need not necessarily be the case and the spacing apart or otherwise of the portions depends to a considerable extent upon the nature of the target which is to be tracked or followed.

The correlator 6 is arranged to correlate each portion of the reference picture individually with the video information derived from the camera arrangement 1 subsequently to the information from which the reference picture was derived. The co-ordinates of the centre points $P_1$ to $P_4$ of the four portions in their respective positions of best fit with the video information are applied to a roll and/or zoom compensating circuit 8, which operates by inserting the aforementioned co-ordinates into mathematical formulae, which will be disclosed hereinafter, to compute the roll and/or zoom which has occurred in the interval between derivation of the reference picture and derivation of the video information with which the reference picture is being correlated. The circuit 8 develops roll and/or zoom error signals which are fed back to the reference picture selector 5 and used to modify the reference picture by rotating and/or expanding it in a sense which would tend to reduce such error signals. By this means the reference picture is modified to enable it to allow for roll and/or relative proximity changes of the camera arrangement 1 relative to the target.

It will be appreciated that each such modification of the reference picture is in a sense tending to make it correlate better with the video information with which it has just been correlated, so that in general the correlation of the modified reference picture with the next incoming frame of picture information will not be ideal and the reference picture will require further modification. However the reference picture is always tending to follow the prevailing roll and/or zoom, so that the correlation tends to be maintained at a reasonably good level. If additional complexity could be tolerated in the system, bearing in mind that the entire missile and its contents, which include all of the circuit components described with reference to FIG. 1, are necessarily expendable, it would be possible to insert an extrapolation circuit into the path of the error signals from circuit 8 to selector 5 so that the likely level of the error signals for the next incoming frame of video information could be predicted on the basis of a linear extrapolation of the error signals obtained from the current frame of video information, so as to modify the reference picture to an extent which would make it more likely to correlate better with said next incoming frame.

Despite the improvement in correlation provided by the invention however, and whether or not extrapolation is employed as referred to above, it is still necessary to provide a circuit 9 which monitors the level of the correlation in the best fit condition for each portion of the reference picture and controls the gate 4 to cause a new reference picture to be selected by selector 5 if the correlation falls below a predetermined threshold level. Conveniently the circuit 9 computes the average correlation level for all four portions and compares this with the threshold level.

Additionally, the co-ordinate information fed to the roll and/or zoom compensating circuit 8 is fed to a control signal generator 10 which is arranged to compute X- and Y- direction control signals, from a pair of mathematical equations which will be referred to hereinafter, for application to control surfaces 11 on the missile to control its flight towards the target, or for application to control the gimbal mounting of the sensor.

As can be seen from FIG. 2, the equation used in generator 10 to generate the normal X- and Y- direction tracking control signals $\delta X$ and $\delta Y$ are:

$4\delta X = \delta x_1 + \delta x_2 + \delta x_3 + \delta x_4$, where $\delta x_1$ is the movement of $P_1$ in the X- direction, after correlation, compared with the initial position as shown in FIG. 2, and $\delta x_2$, $\delta x_3$, $\delta x_4$ have similar significances in relation to $P_2$, $P_3$ and $P_4$ respectively, and $4\delta Y = \delta y_1 + \delta y_2 + \delta y_3 + \delta y_4$ where $\delta y_1$, $\delta y_2$ etc have similar significances to $\delta x_1$, $\delta x_2$ etc but relate to movements in the Y- direction.

The equations used to calculate roll ($\delta \theta$) and zoom ($\delta Z$) in circuit 8 ("zoom" being defined as the fractional expansion of the picture) are as follows:

$$8d\delta\theta = \delta x_1 - \delta x_2 - \delta x_3 + \delta x_4 - \delta y_1 - \delta y_2 + \delta y_3 + \delta y_4$$

and $$8d\delta Z = \delta x_1 + \delta x_2 - \delta x_3 - \delta x_4 + \delta x_1 - \delta y_2 - \delta y_3 + \delta y_4,$$

Both of these equations can easily be determined by considering, separately, a rotation of the points $P_1$ to $P_4$ in a common direction about the origin O and movement of the points $P_1$ to $P_4$ along the diagonals of FIG. 2 in an outward direction from the origin O.

For an oblique view of an area, such as when the sensor is at some angle, in its gimbal mounting, to the projectile's line of motion, a rectangular area appears as a trapezoidal shape. Thus zoom, as previously defined, may vary across the picture and we may obtain equations for evaluating the zoom for various X and Y values from the above evaluated movements $\delta x_1$ etc. and $\delta y_1$ etc.

These are:
$$4d\delta Z_x = \delta x_1 + \delta x_2 - \delta x_3 - \delta x_4$$

and
$$4d\delta Z_y = \delta y_1 - \delta y_2 - \delta y_3 + \delta y_4$$

In some circumstances, it can be advantageous, in order to reduce the effects of noise in the reference picture on the correlation process, to suppress such noise by integrating reference pictures derived from a plurality of different frames of the video information. If this is done, it is desirable to effect compensation for roll and/or zoom before the reference pictures are integrated so that the effects of roll and zoom do not confuse the reference picture if the integration is performed over a usefully long time period.

What I claim is:

1. A tracking and/or guidance system for a vehicle, the system comprising a sensor providing electrical signals forming representations of a field of view of a region towards which the vehicle is travelling, a reference picture selector deriving, a plurality of portions from the said electrical signals, the portions forming reference representations of respective portions of a preselected area of the said field view, a correlator circuit correlating each reference representation with a further representation, subsequently provided by the sensor, in each of a plurality of different positions relative to the further representation, means ascertaining the respective positions of best fit of the reference representations with corresponding portions of the further representation, and means utilising the ascertained positions to rotate and/or change the scale of the reference representations to compensate for rotational misalignment and/or changes of scale between the representation from which the reference representations were derived and the further representation.

2. A system according to claim 1, further comprising a monitoring circuit connected to receive from the correlator circuit indications of the levels of the correlations performed by the correlator circuit and which causes the replacement of the reference representations if the levels are intolerably low.

3. A missile comprising a sensor providing electrical signals forming representations of a field of view of a region towards which the vehicle is travelling, a reference picture selector deriving a plurality of portions from the said electrical signals, the portions forming reference representations of respective portions of a preselected area of the said field of view, a correlator circuit correlating each reference representation with a further representation, subsequently provided by the sensor, in each of a plurality of different positions relative to the further representation, means ascertaining the respective positions of best fit of the reference representations with corresponding portions of the further representation, means utilising the ascertained positions to rotate and/or change the scale of the reference representations to compensate for rotational misalignement and/or changes of scale between the representation from which the reference representations were derived and the further representation, a control signal generator means producing guidance signals in response to the correlator circuit, and control surface means steering the missile in response to the guidance signals.

* * * * *